March 17, 1970   M. J. BISHOP   3,501,646
MULTIPLE-STAGE HIGH-VOLTAGE IMPULSE GENERATORS HAVING
A SERIES ARRAY OF SPARK GAPS IN EACH STAGE
Filed Oct. 3, 1967   2 Sheets-Sheet 2

Inventor
M. J. BISHOP
By Cameron, Kerkam & Sutton
Attorneys ced Mar. 17, 1970

United States Patent Office 3,501,646
Patented Mar. 17, 1970

3,501,646
MULTIPLE-STAGE HIGH-VOLTAGE IMPULSE GENERATORS HAVING A SERIES ARRAY OF SPARK GAPS IN EACH STAGE
Malcolm John Bishop, Oldham, England, assignor to Ferranti Limited, Hollinwood, England, a company of the United Kingdom of Great Britain and Northern Ireland
Filed Oct. 3, 1967, Ser. No. 672,483
Claims priority, application Great Britain, Oct. 8, 1966, 45,064/66
Int. Cl. H02m 3/06, 3/18
U.S. Cl. 307—110
5 Claims

ABSTRACT OF THE DISCLOSURE

Each stage of a multiple-stage high voltage impulse generator includes a capacitor, a charging resistor, and a series array of spark gaps connected across a potential divider network. Means are also provided for triggering each of the spark gap arrays so that all the capacitors of the impulse generator are discharged in series with one another.

---

This invention relates to multiple-stage high-voltage impulse generators.

Impulse generators of this type are well known, and comprise an arrangement whereby a number of capacitors may be charged to a particular voltage whilst connected in parallel with one another, and may then be connected in series to be discharged. In this manner a very high voltage impulse may be obtained, the actual voltage depending upon the charging voltage and the number of capacitors. The arrangement also includes a number of resistors used to control the charging current of the capacitors and to control the shape of the impulse voltage waveform. Each section comprising a capacitor and its charging and waveform resistors is referred to as a "stage" of the impulse generator.

In order to connect the capacitors in series with one another when the impulse is required, each stage also includes a spark-gap, usually of the two-electrode type. Whilst the capacitors of the impulse generator are being charged, the spark gaps present a very high impedance, and the capacitors are effectively connected in parallel. To connect the capacitors in series, the gaps are arranged to break down substantially simultaneously. There are several ways of doing this. For example one electrode of at least one of the gaps may be moved physically towards the other electrodes of the gap until the gap breaks down. Alternatively one or more of the gaps may be triggered in a known manner. There are disadvantages in both these methods. Physical movement of the electrodes of a number of gaps is necessary a rather clumsy way of producing the required result, in view of the size of some impulse generators. The methods involving triggering one or more gaps use a trigger pulse from an external source to break down one gap. The breakdown of this gap produces a voltage surge which is used to trigger the next gap and so on. Thus if one gap should fail to function the breakdown sequence will stop. It is also necessary to arrange the gaps such that ultra-violet radiation produced by the breakdown of one gap is able to ionise the air between the electrodes of the adjacent gap, especially if the adjacent gap is not triggered. Frequently only one or two of the gaps are triggered, and the remainder breakdown because of the increased voltage developed across them.

In order to take measurements and records of the impulse waveform and its effects, it is necessary to know the time delay which occurs between triggering the impulse generator and the impulse being produced. Unfortunately it is difficult to obtain consistent values of this time delay because of the method by which breakdown of the gaps occurs.

A further disadvantage of the usual spark-gap arrangement is that provision has to be made for adjustment of the length of each gap for different operating voltages. This is necessary because it is usual to set each gap so that it will just withstand the applied voltage until breakdown is initiated. Because of this, untriggered sparkover is likely to occur, with the production of unwanted impulses.

An object of the invention is to provide a multiple-stage high-voltage impulse generator in which consistent breakdown may be obtained and in which no adjustment of the spark-gaps is necessary.

According to the present invention there is provided a multiple-stage high-voltage impulse generator in which each stage includes a capacitor, charging connections to allow the capacitors of all stages to be charged in parallel with one another, and discharging connections including in each of said stages a series array of spark gaps to allow the capacitors to be discharged in series with one another thereby providing a voltage impulse, each stage further including a potential divider arranged to determine the relative voltages developed across the said gaps of the array, and an auxiliary pulse generator operable to apply to the array of gaps of the stage a trigger pulse the voltage of which is greater than the breakdown voltage of any one of said gaps, thereby initiating the breakdown of all the gaps in that array.

An embodiment of the invention will now be described, by way of example, with reference to the accompanying drawings, in which.

Figure 1:
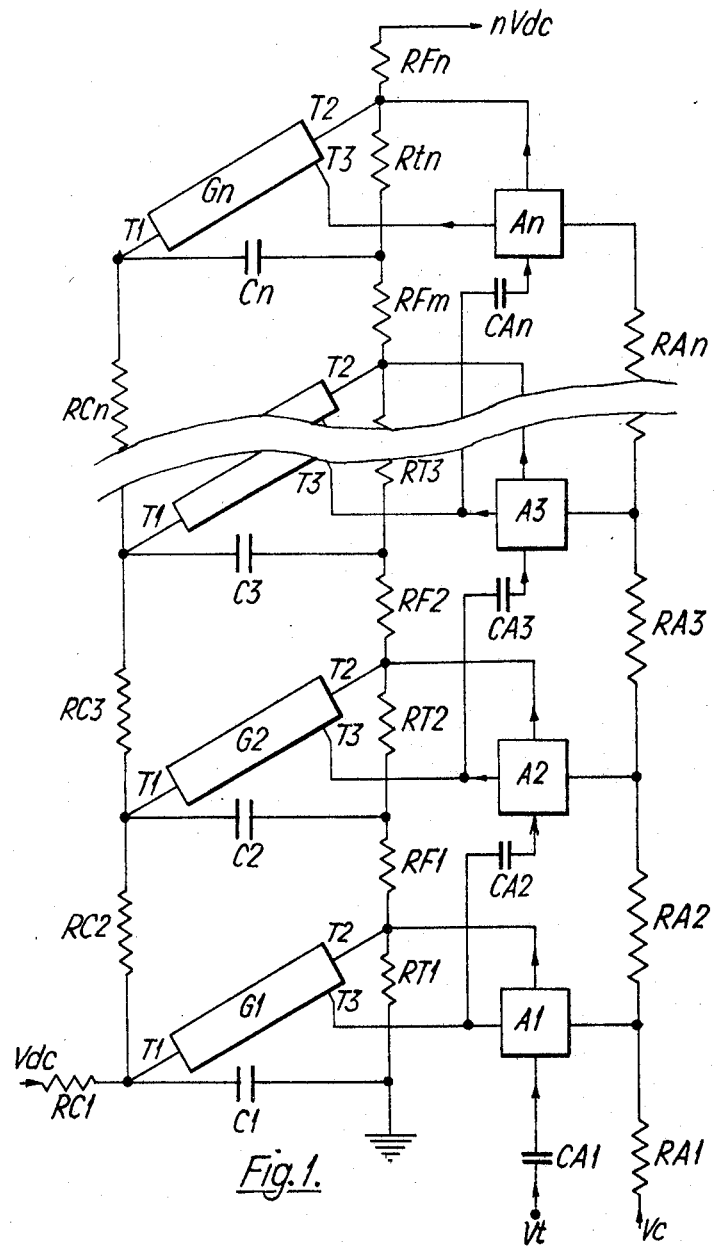
FIGURE 1 is a circuit diagram of part of a multiple-stage impulse generator according to the invention.

Referring now to FIGURE 1, this shows the first two stages and the last stage of an $n$-stage impulse generator. All the stages are identical, the circuit being a conventional impulse generator circuit. The capacitors C1 to C$n$ of the generator are connected between the components of two resistor chains. One chain is formed by the capacitor charging resistors RC1 to RC$n$ in series, and the other by alternate ones of the waveshaping resistors RT1 to RT$n$ and RF1 to RF$n$ in series. For example, capacitor C1 is connected at one end to earth, and at the other end to the junction between charging resistors RC1 and RC2. The earthed end of C1 is also connected to one end resistor RT1, the other end of which is connected to the lower end, as viewed in the drawing, of resistor RF1. Similarly capacitor C2 is connected at one end to the junction of charging resistors RC2 and RC3, and at the other end to the junction between RF1 and a further resistor RF2.

Each stage of the impulse generator also includes a triggered spark gap array, shown schematically at G1 to G$n$. Each array is connected across the series combination of the stage capacitor C and its associated wave-tail shaping resistor R$t$. For example array G1 is connected between the junction of C1, RC1 and RC2, by terminal T1 of the array, and the junction of RT1 and RF1 by terminal T2 of the array. The high-voltage output from the impulse generator is taken from the final wavefront shaping resistor RF$n$.

As is usual with the circuit described, the stage capacitors are charged by a source V$dc$ through the charging resistors. When the spark arrays are triggered, the capacitors are connected in series, and a voltage impulse of $n.Vdc$ is obtained.

As shown in FIGURE 1, each spark-gap array is triggered by its own auxiliary pulse generator A. For example the trigger output of the auxiliary pulse generator is connected between terminals T2 and T3 of the array G1. The auxiliary pulse generator A1 is triggered through a capacitor CA1 by a voltage pulse $Vt$; the circuitry of one form of auxiliary pulse generator is described later. As shown in FIGURE 1 the output of each auxiliary pulse generator is also used to trigger the next auxiliary generator through a coupling capacitor. The auxiliary pulse generator requires a source of charging current, and this is shown as $Vc$, with the charging resistors shown at RA1 to RA$n$.

Figure 2:
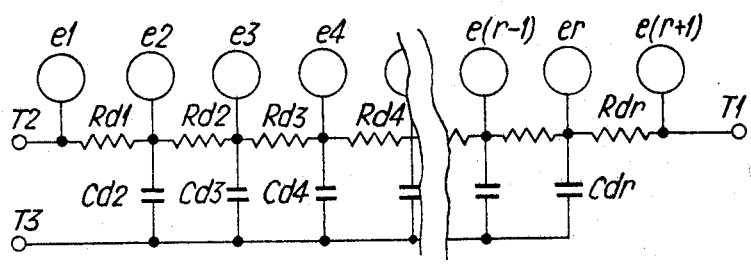
FIGURE 2 is a circuit diagram of a multiple-electrode spark gap array for a single stage of the impulse generator.

FIGURE 2 shows the type of spark-gap array used for each stage. This comprises a fixed-electrode multiple-gap array having electrodes denoted by $e1$ to $e(r+1)$. All the gaps are of the same length. Each electrode is connected to a potential divider comprising a chain of resistors $Rd1$ to $Rdr$, connecting terminal T2 to T1; thus electrode $e1$ is connected between terminal T2 and resistor $Rd1$, electrode $e2$ between resistors $Rd1$ and $Rd2$, and so on, electrode $e(r+1)$ being connected between $Rdr$ and terminal T1. Each electrode except the end electrodes $e1$ and $e(r+1)$ is connected through a capacitor $Cd$ to a common line leading to the trigger terminal T3.

The operation of the multiple-electrode array is as follows:

With a voltage of $Vdc$ applied to each main spark-gap array the voltage appearing across each of the gaps is $Vdc/r$, where $r$ is the number of gaps, assuming that all the resistors $Rd$ are of equal value. This voltage must, of course be kept below the sparkover voltage $Vs$ of each gap.

A voltage pulse $Vp$ is applied to terminal T3 to trigger the spark-gap array. This voltage must be of the same polarity as the voltage applied to terminal T1, and must be considerably greater than $Vs$. The pulse is applied through the capacitors $Cd2$ to $Cdr$ to each of the electrodes except the end ones, $e1$ and $e(r+1)$, and hence the potential of each electrode except these two rises by the value $Vp$. A voltage of $(Vp+Vdc/r)$ now appears across the gap between the electrodes $e1$ and $e2$, since the potential of $e2$ rises by $Vp$ with respect to $e1$. In a similar manner the voltage between electrodes $er$ and $e(r+1)$ becomes $(Vp-Vdc/r)$, since electrode $er$ rises in potential by $Vp$ relative to $e(r+1)$. Since $Vp$ is much greater than $Vs$, the gap sparkover voltage, and $Vdc/r$ is less than $Vs$, the two end gaps will break down. The total stage voltage $Vdc$ now appears across the remaining stages of the spark-gap array. Due, however, to the presence of the capacitors $Cd$ this voltage is not distributed evenly along the remaining gaps. Instead, the two gaps which are now outermost, that between $e1$ and $e2$, and that between $er$ and $e(r-1)$ will each experience an increase of $Vdc/r$, the potential which previously existed across the outermost stages before they broke down. Thus, the voltage between electrodes $e1$ and $e2$ becomes $(Vp+2Vdc/r)$, whilst that between electrodes $er$ and $e(r-1)$ becomes $(Vp-2Vdc/r)$, assuming that the voltage pulse $Vp$ is still present. These two gaps will now break down, and the process will continue throughout the array. It should be remembered that process of breakdown is very rapid indeed, and this accounts for the uneven voltage distribution once breakdown has commenced.

The last gap to break down does not feel the influence of the trigger pulse $Vp$. This is because the output of the pulse generator is effectively short-circuited. Consider, for example, that the last gap is that between electrode $e4$ and the following electrode (called, say, $e(r-2)$). Electrode $e4$ is connected by the discharge path to $e1$, and hence to one end of the pulse generator. The other end of the pulse generator output is connected to T3, as described below, and hence the trigger pulse $Vp$ is applied across $Cd4$. Although the capacitors $Cd$ do not charge up sufficiently rapidly to produce a uniform distribution of voltage once breakdown occurs, the charge on $Cd4$ will have been building up gradually as each successive gap breaks down, and will have become fairly steady when only the last gap is left. In this case the voltage across the last gap will be only $Vdc$. It is possible that the $Vp$ pulse will increase this, but in order to consider the operation of the spark gap it is necessary to deal with the worst possible conditions. Any increase in the voltage across a gap assists breakdown. The voltage $Vdc$ is sufficient to cause the breakdown of a single gap.

To comply with the requirements mentioned above, $Vdc$ should be at least equal to $2Vs$, and the maximum value of $Vdc$ should not exceed $0.8rVs$, the latter requirements being that of preventing sparkover of the gaps. These requirements give the operating range of the multiple-electrode gap array, since $0.8rVs \geqslant Vdc \geqslant 2Vs$. Hence for sparkover voltage $Vs$ of 15 kv. for each gap of the assembly, and an assembly of, say, sixteen gaps, the maximum value of $Vdc$ for satisfactory operation range is about 200 kv., whilst the minimum value of $Vdc$ is about 30 kv. This applies to each separate stage of the impulse generator, without any adjustment being necessary.

Figure 3:
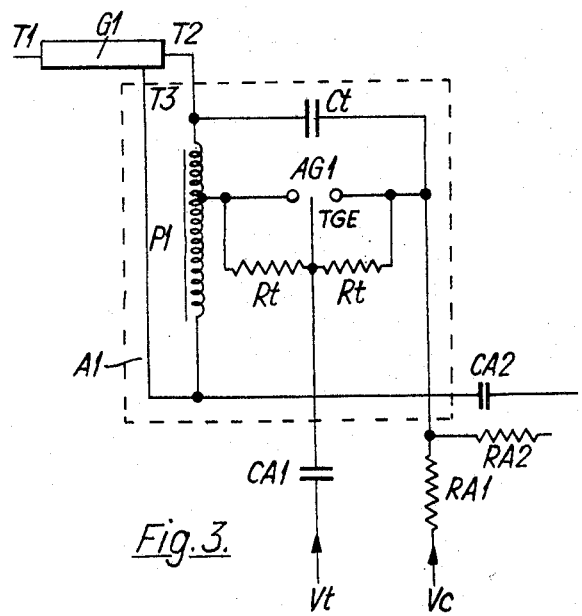
FIGURE 3 is a circuit diagram of one form of auxiliary pulse generator.

FIGURE 3 shows one form of auxiliary pulse generator suitable for triggering each of the main arrays in the impulse generator. This comprises a step-up pulse transformer P1, a capacitor $Ct$, and a triggered spark gap or similar device AG1. The pulse transformer is connected between the terminals T2 and T3 of the main array as shown. The capacitor $Ct$ is connected between the upper end of the pulse transformer and a charging resistor chain comprising resistors RA1, RA2, etc. The three-electrode spark gap AG1 has one main electrode connected to a tapping on the pulse transformer and the other main electrode connected to the junction between the capacitor $Ct$ and the charging resistor chain. The trigger electrode TGE of the spark gap is connected to two resistors $Rt$, each of which is connected to a separate one of the main electrodes. The trigger electrode is connected through a capacitor CA1 to a source of triggering voltage $Vt$. The charging resistor RA1 is connected to a source of charging voltage $Vc$.

As shown in FIGURE 1, the auxiliary pulse generators are connected in cascade, such that the output from one pulse generator which triggers a main array of the impulse generator also triggers the next pulse generator in sequence. In FIGURE 3 the lower end of the pulse transformer is connected to the terminal T3 of the array G1 and also through a capacitor CA2 to the trigger electrode of the next spark gap AG2. Similarly the resistor RA2 is connected to the capacitor $Ct$ in the auxiliary pulse generator A2.

In operation, the capacitor $Ct$ of each auxiliary pulse generator is charged from the source $Vc$. The trigger electrode TGE of the spark gap is maintained at half this potential by the resistors $Rt$. When a trigger pulse $Vt$ is applied to the trigger electrode the gap breaks down, and the capacitor $Ct$ discharges through it and through the upper part of the pulse transformer. A large pulse is developed across the whole of the pulse transformer, and this triggers the main array of the impulse generator and also the next auxiliary pulse generator.

The operation of the impulse generator of FIGURE 1 will be apparent from the above description. There are several advantages resulting from the use of multiple-electrode spark gap arrays and auxiliary pulse generators. Some of these have already been stated. A further advantage of the multiple-electrode spark gap array is that a wide operating range may be obtained; a range of 30 kv. to 200 kv. per stage is quoted earlier. The series of gaps making up the array of the impulse generator may be made much more compact than a conventional two-electrode gap.

The use of a separate auxiliary impulse generator for each main array means that the operation of one array is completely independent of the operation of the preceding array. Accordingly it is not necessary to construct the impulse generator so that the main arrays can "see" each other, and greater freedom in the layout of the impulse generator is obtained.

The number of gaps in each array is not critical. However, if each gap is made too small, the effects of electrode erosion due to sparking may become noticeable. Similarly if the gaps are made too large, and the number of gaps is reduced, then the sparkover voltage $V_s$ rises and with it the necessary trigger voltage. It has been stated that the trigger voltage $V_p$ applied to a main array should be considerably greater than the sparkover-voltage $V_s$ of a single gap. In practice $V_p$ should preferably be at least ten time $V_s$.

As shown in FIGURE 3, and described above, the triggered spark gap of each auxiliary pulse generator is shown as a three-electrode gap. This may be replaced by other devices, such as a "Trigatron" (registered trademark), an enclosed spark gap, or a hydrogen thyratron.

The connection of the auxiliary pulse generators in cascade, shown in FIGURE 1, may be varied if required. For example if it is required to synchronise the triggering of all the main arrays, then all the auxiliary pulse generators may be triggered simultaneously. Alternatively, suitable delay lines may be incorporated between each auxiliary pulse generator and its associated main array to obtain synchronous triggering.

By way of example only, each main array may comprise sixteen fixed gaps (that is seventeen electrodes), each having a gap of, say, 0.2 inch. The potential divider chain may comprise resistors $Rd$ of 500 megohms, and capacitors $Cd$ of 5 picofarads. As already stated, such an assembly would have a useful operating range of 30 kv. to 200 kv.

If the impulse generator of FIGURE 1 comprises 10 stages, its operating range will be from 300 kv. to 2 mv., and no adjustment of the gaps is necessary to obtain this wide range.

What we claim is:

1. A multiple-stage high-voltage impulse generator in which each stage includes a capacitor, charging connections to allow the capacitor to be charged in parallel with the corresponding capacitors of all other stages, discharging connections to allow the capacitor to be discharged in series with the corresponding capacitors of all other stages, said discharging connections including a potential divider, an array of fixed spark gap electrodes connected at spaced points on the potential divider, a capacitor connected to each except the outermost electrodes and to a common line, an auxiliary pulse generator operable to provide a trigger pulse the voltage of which is greater than the breakdown voltage of any one of the spark gaps, and means for connecting the output of the auxiliary pulse generator to said common line to trigger the spark gap array.

2. An impulse generator as claimed in claim 1 including coupling means between the auxiliary pulse generators for allowing said generators all to be operated by a single initiating pulse.

3. An inpulse generator as claimed in claim 1 in which said initiating pulse is applied to one only of said auxiliary pulse generators, the trigger pulse from each auxiliary pulse generator being used to operate the next adjacent auxiliary pulse generator.

4. A high voltage impulse generator comprising a plurality of stages, each stage including a charging capacitor, a charging resistor and a pair of serially connected resistors, said charging capacitor being connected between one end of the charging resistor and one end of said serially connected resistors, means for separately connecting the charging resistors and serially connected resistors of each stage in series to form, respectively, a first and a second resistor chain, means for applying a charging voltage to said first resistor chain for charging the capacitors of all stages in parallel with one another, means for taking an output pulse from said second resistor chain, each stage further including a series array of spark gaps connected between said one end of the charging resistor and the junction of said serially connected resistors of that stage to allow the capacitors to be discharged in series with one another, each series array of spark gaps comprising a potential divider, a plurality of fixed electrodes connected at spaced points on the potential divider, a capacitor connected to each except the outermost electrodes and to a common line, auxiliary pulse generator means for triggering each of the spark gap arrays to effect the discharge of said capacitors, and means for connecting said common line to said auxiliary pulse generator to trigger the spark gap array.

5. A multiple-stage high-voltage impulse generator in which each stage includes a capacitor, charging connections to allow the capacitors of all stages to be charged in parallel with one another, discharging connections to allow said capacitors of all stages to be discharged in series with one another, said discharging connections including a potential divider, an array of fixed spark gap electrodes connected at space points on the potential divider to determine the relative voltages developed across the said gaps of the array, an auxiliary pulse generator operable to apply to the array of gaps of the stage a trigger voltage which is greater than the breakdown voltage of any one of said gaps, thereby initiating the breakdown of all the gaps in that array, means connected between said pulse generator and each except the outermost electrodes of the array for coupling the trigger voltage to all except the outermost electrodes of the associated gap array.

References Cited

UNITED STATES PATENTS

| | | | |
|---|---|---|---|
| 2,221,573 | 11/1940 | Bruckmann | 307—108 |
| 2,419,574 | 4/1947 | Lehmann | 307—108 |
| 2,524,240 | 10/1950 | Titterton | 307—108 |
| 2,605,310 | 7/1952 | White | 307—110 |
| 3,073,973 | 1/1963 | Rodewald | 307—110 |
| 3,257,637 | 6/1966 | Henry | 320—1 |

TERRELL W. FEARS, Primary Examiner

HOWARD L. BERNSTEIN, Assistant Examiner

U.S. Cl. X.R.

307—108